United States Patent
de Leon et al.

(10) Patent No.: US 11,052,374 B2
(45) Date of Patent: Jul. 6, 2021

(54) SURFACTANT-TEMPLATED SYNTHESIS OF NANOSTRUCTURED XEROGEL ADSORBENT PLATFORMS

(71) Applicant: UCHICAGO ARGONNE, LLC, Chicago, IL (US)

(72) Inventors: Patricia Ignacio de Leon, Westmont, IL (US); Philip D. Laible, Downers Grove, IL (US); Mackenzie Elizabeth Meyer, Ann Arbor, MI (US); Christopher R. Povinelli, Milwaukee, WI (US); Killian L. Tracey, Geneva, IL (US); Daniel Yoav Arenas, Chicago, IL (US)

(73) Assignee: UChicago Argonne, LLC, Chicago, IL (US)

(*) Notice: Subject to any disclaimer, the term of this patent is extended or adjusted under 35 U.S.C. 154(b) by 92 days.

(21) Appl. No.: 16/228,593

(22) Filed: Dec. 20, 2018

(65) Prior Publication Data

US 2020/0197900 A1 Jun. 25, 2020

(51) Int. Cl.

| | |
|---|---|
| *B01J 20/10* | (2006.01) |
| *B01J 20/24* | (2006.01) |
| *C01B 33/16* | (2006.01) |
| *B01J 20/28* | (2006.01) |
| *B01J 20/22* | (2006.01) |
| *C09K 3/32* | (2006.01) |
| *B01J 20/30* | (2006.01) |
| *B01J 20/32* | (2006.01) |

(52) U.S. Cl.
CPC .......... *B01J 20/103* (2013.01); *B01J 20/223* (2013.01); *B01J 20/24* (2013.01); *B01J 20/28047* (2013.01); *B01J 20/28085* (2013.01); *B01J 20/3064* (2013.01); *B01J 20/3085* (2013.01); *B01J 20/3204* (2013.01); *B01J 20/3265* (2013.01); *B01J 20/3268* (2013.01); *C01B 33/163* (2013.01); *C09K 3/32* (2013.01)

(58) Field of Classification Search
CPC ........ B01J 20/103; B01J 20/223; B01J 20/24; B01J 20/28047; B01J 20/28085; B01J 20/3064; B01J 20/3085; B01J 20/3204; B01J 20/3265; B01J 20/3268; C01B 33/163; C09K 3/32
See application file for complete search history.

(56) References Cited

U.S. PATENT DOCUMENTS

| | | |
|---|---|---|
| 9,285,300 B2 | 3/2016 | Nakanishi et al. |
| 2007/0154379 A1 | 7/2007 | Nakanishi et al. |
| 2014/0178657 A1* | 6/2014 | Jewhurst ............... G02B 1/115 428/212 |
| 2014/0182670 A1* | 7/2014 | Van Duren ........... H01L 31/048 136/256 |

OTHER PUBLICATIONS

"Aerogel," Wikipedia, 11 pages, accessed Oct. 8, 2018.
Hayase, et al., "New flexible aerogels and xerogels derived from methyltrimethoxysilane/dimethyldimethoxysilane co-precursors," Journal of Materials Chemistry 21, pp. 17077-17079 (2011).
Hisconmez & Eral, "Investigation of thorium(IV) separation from cerium(IV) on a silica gel column coated with tri-octylphosphine oxide," Journal of Alloys and Compounds 271-273, pp. 620-624 (1998).
Shamsipur, et al., "A Rapid Method for the Extraction and Separation of Uranium from Thorium and Other Accompanying Elements Using Octadecyl Silica Membrane Disks Modified by Tri-n-octyl Phosphine Oxide," Separation Science and Technology 35(7), pp. 1011-1019 (2000).

* cited by examiner

*Primary Examiner* — Irina S Zemel

(74) *Attorney, Agent, or Firm* — Foley & Lardner LLP

(57) ABSTRACT

A process for separations and recovery from mixtures via specific adsorption using high-surface area, flexible silica-based nanostructured gel adsorbents and articles of manufacture relating to same.

14 Claims, 7 Drawing Sheets

SURFACTANT-TEMPLATED SYNTHESIS OF NANOSTRUCTURED XEROGEL ADSORBENT PLATFORMS

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to adsorbent platforms synthesis materials, more particularly to monolithic, nanostructured surfactant-templated materials and scalable synthesis and facile further surface modification of the same.

BACKGROUND

Gels are a versatile class of materials consisting of a fluid dispersed in a continuous solid phase. The solid phase is typically cross-linked materials. Gels can have a wide range of properties, including hardness, adhesion, etc. Gels that have air as the "fluid" known as aerogels. Typically, in aerogels, the fluid phase of the aerogel is replaced by a gas such that the solid network is maintained, preferably with minimal shrinking (less than 20% and most recently to even less than 0.5%). They also typically have an extremely low density and low thermal conductivity and typically demonstrate a specific geometric pattern. Since its first synthesis in 1931, aerogel chemistry rapidly expanded due to facile sol-gel processes that allow for non-energy-intensive, scalable, and rapid production of these materials. Silica-based gels are among the most popular due to well-known siloxane chemistry which provides a handle for tuning properties such as hydrophilicity/hydrophobicity, morphology and opportunities for post-synthesis treatment (additional surface modification).

Xerogels are another type of gel, similar to related aerogel materials, with open network formed by the removal of all swelling agents from a gel. A xerogel is a solid formed from a gel by drying with unhindered shrinkage. That is, xerogels are formed by removal of the liquid phase of a gel by evaporation, without concern for the shrinkage, typically exhibiting greater than 0.5% shrinkage, or even greater (in comparison to aerogels). The shape may be retained but structure defects such as cracks may form. Xerogels usually retain high porosity (15-50%) and enormous surface area (150-900 $m^2/g$), along with very small pore size (1-10 nm). When solvent removal occurs under supercritical conditions, the network does not shrink and a highly porous, low-density material known as an aerogel is produced. Heat treatment of a xerogel at elevated temperature produces viscous sintering (shrinkage of the xerogel due to a small amount of viscous flow) and effectively transforms the porous gel into a dense glass. Xerogels are highly porous solids that can be synthesized with diverse compositions and unique mechanochemical properties (inorganic oxides, organic polymers, and hybrids thereof) and thus finds wide applicability, such as adsorbents, catalysts and catalyst scaffolds, filters for separations, and thermal insulators.

While xerogels have shown promise as a platform for facilitating separations, there remains a need for a synthesis technique that is capable of controllably producing xerogels with selective properties.

SUMMARY

One embodiment relates method of making an xerogel material. The method comprises mixing a organosilane precursor, a catalyst, and a zwitterionic porogen to form a reaction mixture in a solvent. The organosilane precursors are reacted, forming a silica-based material patterned on the zwitterionic porogen. The zwitterionic porogen is removed.

Another embodiment relates to A xerogel material comprising a silane material and a tethering molecule.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 5B illustrates the successful and uniform modification with TOPO of interior surfaces within the porous gel FIG. 6A is a SEM image. FIG. 6B shows silicon elemental mapping of the same area as in FIG. 6A but via EDS to visualize successful non-covalent tethering of carboxylic acid scavenger TOPO moieties. FIG. 6C shows phosphorous elemental mapping of the same as FIG. 6B via EDS to visualize successful non-covalent tethering of carboxylic acid scavenger TOPO moieties.

Figure 1:
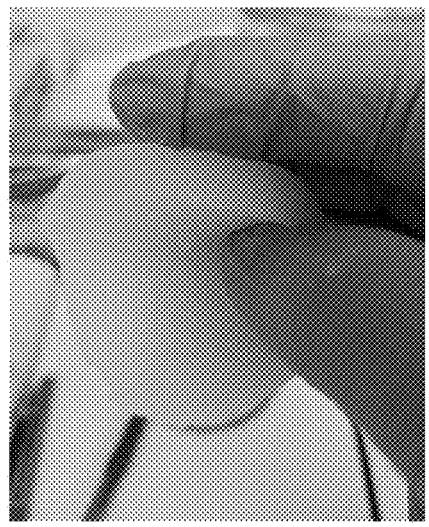
FIG. 1 shows flexible and porous silica-based gels.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

The present invention relates to an article of manufacture and synthesis thereof providing for a process for separations and recovery from mixtures via specific adsorption using high-surface area, flexible silica-based nanostructured gel adsorbents. As described further below, embodiments use organosilane precursors or monomers. The organosilane precursors generally have the form of R—Si—(OR)3 where R is an alkyl (such as where C1-C18, including linear and branched), an aromatic (such as aryls), or a hetero atom (such as alcohol, epoxide, amine, or thiol) or is unsaturated (such as with terminal alkenes or alkynes). The precursors undergo a combination of acid- and base-catalyzed hydrolysis of the alkoxy (OR) groups to form an extended R—Si—O—Si—R covalent network.

The xerogel materials described herein open up a wide variety of new application, such as consumer goods like skin wipes to filter products such as portable mask filters. In addition, the methods described herein allow for a wide range of porogens to be used for the formation of the xerogel material. The choice of porogen template allows one to precisely tune the pore characteristics such as their size (tends to hundreds of nanometers, which can control what can and cannot be adsorbed based on size) and density (how many pores in each unit volume, which also dictates the overall void volume, "lightness" and flexibility of the material.

The precursors are hydrolyzed in the presence of a pore-generating template (porogen). The hydrolyzed materials for a solid structure having pores defined by the porogen. In particular, the resulting product is a monolithic structure whose overall size and shape are dependent on the volumes of starting materials and the shape of the reaction vessel used, respectively. The choice of organosilane precursors dictates the properties of the resulting xerogels. Those skilled in the art will appreciate that the precursors may impart particular properties to the resultant xerogel: hydrophobic xerogels are made with combinations of alkyl and aromatic organosilanes, more hydrophilic xerogels are achieved with amine and combinations thereof with thiol organosilane precursors. The use of organosilanes with reactive end groups such as amines, carboxylic acids and terminal vinyl groups allow for further surface modification to tailor the specificity of the adsorbents (i.e., ability to selectively bind a particular target molecule from a mixture). Hybrid xerogels can use mixtures of hydrophilic and hydrophobic precursors. These gels can be used to improve binding specificity and to achieve targeting of particular molecules with near molecular/atomic resolution (not unlike that of recognition of biological enzymes for ligands and substrates).

The surface area, pore size, and total pore volume may also be controlled with the choice of the porogen, around which the reactant monomers form an interconnected solid network to form a gel. The ability to tune the size of the pores within the xerogel may be of particular relevance to make sure that the target molecule to be adsorbed can fit within the pores and thus be able to diffuse into interior binding sites throughout the xerogel structure (i.e., not just on the exterior surfaces). As one example, in an application where the xerogel is to be used for in situ bioproduct recovery in a bioreactor (aka separations-integrated fermentation or fermentation-incorporated separations), the pores must be smaller than the microorganism to prevent biofouling (or biofilm formation on the surface or within the interior) and blockage of the pores due to microbial communities growing within the xerogel. For example, the pores are smaller than 1 micron (ideally less than 500 nm). Cell exclusion for xerogels with pores larger than 1 micron can be approached by tuning the surface of the materials to be superhydrophobic.

In one embodiment, the porogen comprises surfactant micelles used as templates due to variability in size and composition. The surfactant micelles may comprise cationic (such as CTAC and CTAB), anionic (such as SDS), and zwitterionic detergents (such as Deriphat 160C and DDAO), as well as non-ionic surfactants (such as dodecyl maltoside, octyl glucoside, and Triton X-100). The surfactant may be amphoteric. The use of zwitterionic surfactants allows one to tune the overall charges on the surface of the micelles that act as pore template. For example, a positively-charged cationic surfactant may not work with amine organosilane precursors (where the amine group can be protonated) due to electrostatic repulsion between micelle surface and organosilane functional groups. Conversely, negatively-charged anionic surfactants may not work with carboxylic acid (where the —COOH group can be deprotonated) and or carboxylate-terminated organosilane precursors. See, e.g., embodiment for methodology 12a-12b below regarding controlling micelle properties simply by changing the mixture environment from mildly acidic to neutral or slightly basic by discarding the use of acetic acid catalyst.

In one embodiment, the size of the xerogel pores can be turned for a given porogen by changing the ionic strength of the reaction mixtures. The sizes of detergent micelles are known to be effected greatly by the salt concentration of buffers. This property is another parameter that can be used to fine tune the resulting xerogel morphology and composition.

In another embodiment, the porogen comprises a plurality of different compounds, for example different detergent micelles, in the construction of xerogels. One would create detergent micelles comprised of one or more detergents. This has the power of adding additional chemistry or minimizing complicating chemistry. Mixed micelles are also of different size from micelles comprised of single detergents and their size may be more or less tunable by the ionic strength of the reaction mixture. The use of more than one detergent for the porogen may provide for multiple pore sizes where one group of pores have a first average pore diameter and a second group of pores have a second average pore diameter different from the first.

The porogen is removed following the formation of the solid structure. Porogen removal depends on the specific porogen, but can include washing, heat-treatment to evaporate or thermally decompose, among other techniques. The remove of the porogen results in ultralight, flexible and compressible materials with extremely high surface areas (up to >1000 m$^2$/g), for example 300-1000 m$^2$/g.

In one embodiment, trialkoxysilanes of general formula R—Si—(OR)3 and dialkoxysilanes of general formula R2—Si—(OR)2 may be used separately as sole precursors; alternatively, mixtures may be used but limited to stoichiometric amounts at 3:2 ratio of trialkoxy- and dialkoxysilanes, respectively. The precursors are mixed together and added to an aqueous solution containing dissolved surfactant (porogen) and acid or base catalyst. Surfactant concentration is determined by choice of surfactant and its critical micelle concentration. Critical micelle concentration (CMC) values are well documented for various surfactants dissolved in different solvents. Further, one can also template off of liposomes or nanodiscs or naturally derived lipid vesicles or organelles.

The concentration of the acid catalyst is based on the isoelectric point of the chosen surfactant and the choice of organosilane precursor. Acid catalysts are typically volatile acids that are easily removed by heat or rinsing, including organic acids (acetic acid, propanoic acid, etc.) and mineral acids (hydrochloric acid and nitric acid). The use of acid catalysts is compatible with organosilanes where the group R—Si excludes Lewis bases such as amines. In cases where the organosilane contains a Lewis base (e.g., 3-aminopropyltrimethoxysilane, 3-aminopropyltriethoxysilane, 3-aminopropylmethyldimethoxysilane, 3-aminopropylmethyldiethoxysilane, etc.), the aqueous surfactant mixture may exclude the use of an acid catalyst. Concentrations can be calculated by someone skilled in the art, for example based on pKa or pKb values (which are well-documented) and using well-known Henderson-Hasselbach equation for buffers.

The concentration of the base catalyst is based on the isoelectric point of the chosen surfactant and the choice of organosilane precursor. Base catalysts are typically volatile bases that are easily removed by heat or rinsing, including amines (ammonia, trimethylamine, etc.) and inorganic bases (sodium hydroxide, sodium carbonate, etc.). Base catalysts can include precursor compounds that only release the base depending on reaction conditions; an example will be the use of urea as a base precursor wherein ammonia is only present in the mixture upon the thermal decomposition of urea at 80° C. into ammonia and carbon dioxide: $(NH_2)2CO+H_2O \rightarrow NH_3+CO_2$. The acid or base catalyst facilitates xerogel formation by catalyzing hydrolysis of the alkoxysilane groups to form an extended covalent network: R—Si—OR+$H_2O \rightarrow$R—Si—O—Si—R+ROH where each Si—OR linkage can become an Si—O—Si.

The examples herein describe specific time periods and temperatures for the interaction of precursor, catalyst, and porogen. In various embodiments, the method can be employed from room-temperature up to the boiling point of the solvent (i.e., 100° C. if in aqueous solution). For synthetic procedures in other organic solvents then the temperature range can be expanded (e.g., 150° C. for dimethylformamide). As for reaction duration, it can be as short as 15 min up and up to several days (up to 7) at elevated temperatures. One of skill will appreciate that the amount of catalyst added impacts, as well as temperature, impacts the rate of the reaction.

Additional embodiments relate to other than organosilanes. For example, in one embodiment, the process can also be extended to the preparation of organotitania based gels using titanium isopropoxide.

In one particular example methodology 1a-1c for xerogel preparation involving only trialkoxysilanes: In a vial containing 0.9 g cetyltrimethylammonium bromide (CTAB, cationic surfactant, the porogen in this embodiment) and 5 g urea (catalyst) co-dissolved in 15 mL of aqueous 5 mM acetic acid, 5 mL of trialkoxysilane precursor was added with mixing. This experiment was performed separately for three triakoxysilane precursors, methyltrimethoxysilane (MTMS), octyltrimethoxysilane (OTMS) and phenyltrimethoxysilane (PTMS). The resulting mixtures were allowed to stir for 30 minutes to ensure homogeneity. The vials were then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying.

In yet another sample methodology 2 for xerogel preparation involving only trialkoxysilanes: In a vial containing 0.9 g CTAB and 5 g urea co-dissolved in 15 mL of aqueous 5 mM acetic acid, 2.4 g MTMS and 3.5 g PTMS (i.e., 1:1 stoichiometric amounts MTMS:PTMS) were added with mixing. The resulting mixture was allowed to stir for 30 minutes to ensure homogeneity. The vial was then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying.

In yet another sample methodology 3 for xerogel preparation involving a mixture of trialkoxysilanes and dialkoxysilanes: In a vial containing 0.9 g CTAB and 5 g urea co-dissolved in 15 mL of aqueous 5 mM acetic acid, 2.9 g MTMS and 3.8 g diphenyldiethoxysilane (DPDES) were added with mixing. The resulting mixture was allowed to stir for 30 minutes to ensure homogeneity. The vial was then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying.

In yet another sample methodology 4 for xerogel preparation involving a mixture of trialkoxysilanes and dialkoxysilanes: In a vial containing 0.9 g CTAB and 5 g urea co-dissolved in 15 mL of aqueous 5 mM acetic acid, 2.9 g MTMS and 1.7 g dimethyldimethoxysilane (DMDMS) were added with mixing. The resulting mixture was allowed to stir for 30 minutes to ensure homogeneity. The vial was then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying.

In yet another sample methodology 5a-5b for xerogel preparation involving a mixture of trialkoxysilanes and dialkoxysilanes: In a vial containing 0.9 g CTAB and 5 g urea co-dissolved in 15 mL of aqueous 5 mM acetic acid, 4.2 g 3-mercaptopropyltrimethoxysilane (Pr(SH)TMS) and 2.6 g 3-mercaptopropylmethyldimethoxysilane (Pr(SH)MeDMS) were added with mixing. The resulting mixture was allowed to stir for 30 minutes to ensure homogeneity. The vial was then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying. The above experiment was repeated substituting 2.6 g Pr(SH)MeDMS with 1.7 g DMDMS instead.

In yet another sample methodology 6a-6b for xerogel preparation involving a mixture of trialkoxysilanes and dialkoxysilanes to introduce more than one functionality (amine and alkyl, amine and thiol): In a vial containing 0.9 g CTAB and 5 g urea co-dissolved in 15 mL of aqueous 5 mM acetic acid, 3.8 g 3-aminopropyltrimethoxysilane (APTMS) and 1.7 g DMDMS were added with mixing. The resulting mixture was allowed to stir for 30 minutes to ensure homogeneity. The vial was then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying. The above experiment was repeated substituting 1.7 g DMDMS with 2.6 g Pr(SH)MeDMS instead.

In yet another sample methodology 7a-7c for xerogel preparation involving a mixture of trialkoxysilanes and dialkoxysilanes, with varying surfactants: In three separate vials containing varied amounts of different surfactants and 5 g urea co-dissolved in 15 mL of aqueous 5 mM acetic acid, 2.9 g MTMS and 1.7 g DMDMS were added with mixing. Surfactants used were: 1.5 mg lauryldimethylamine N-oxide (LDAO, zwitterionic surfactant at pH 7.2, vial 1), 5 mg Deriphat 160c (anionic surfactant, vial 2) and 1 mg n-dodecyl beta-D-maltoside (DDM, uncharged sugar surfactant, vial 3). The resulting mixtures were allowed to stir for 30 minutes to ensure homogeneity. The vials were then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying.

In yet another sample methodology 8a-8c for xerogel preparation involving a mixture of trialkoxysilanes and dialkoxysilanes, with varying surfactants: in three separate vials containing varied amounts of different surfactants and 5 g urea co-dissolved in 15 mL of aqueous 5 mM acetic acid, 3.8 g APTMS and 1.7 g DMDMS were added with mixing. Surfactants used were: 1.5 mg lauryldimethylamine N-oxide (LDAO, zwitterionic surfactant at pH 7.2, vial 1), 5 mg Deriphat 160c (anionic surfactant, vial 2) and 1 mg n-dodecyl beta-D-maltoside (DDM, non-ionic sugar surfactant, vial 3). The resulting mixtures were allowed to stir for 30 minutes to ensure homogeneity. The vials were then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying.

In yet another sample methodology 9a-9g for xerogel preparation involving a mixture of trialkoxysilanes and dialkoxysilanes, with varying surfactants: In six separate vials containing varied amounts of Deriphat 160c surfactant and 5 g urea co-dissolved in 15 mL of aqueous 5 mM acetic acid, 3.8 g APTMS and 1.7 g DMDMS were added with mixing. Surfactant amounts used ranged in concentration in the mixture: 11, 13, 15, 20, 25 and 30 g/L aqueous mixture (prior to addition of organosilanes). The resulting mixtures were allowed to stir for 30 minutes to ensure homogeneity. The vials were then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying. One of the above experiments (using 15 g/L Deriphat 160c surfactant) was repeated substituting 1.7 g DMDMS with 2.6 g Pr(SH)MeDMS instead.

In yet another sample methodology 10a-10c for xerogel preparation involving a mixture of trialkoxysilanes and dialkoxysilanes, with varying base catalyst precursor: In three separate vials containing 225 mg Deriphat 160c surfactant and varying amounts of urea co-dissolved in 15 mL of aqueous 5 mM acetic acid, 3.8 g APTMS and 1.7 g DMDMS were added with mixing. Base catalyst precursor (urea) amounts used were: 1.25 g (vial 1), 2.5 g (vial 2) and 5 g (vial 3). The resulting mixtures were allowed to stir for 30 minutes to ensure homogeneity. The vials were then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying.

In yet another sample methodology 11a-11d for xerogel preparation involving a mixture of trialkoxysilanes and dialkoxysilanes, with varying amounts of inorganic salts: In four separate vials containing 225 mg Deriphat 160c surfactant, 5 g urea and varying amounts of inorganic salt (sodium chloride) were co-dissolved in 15 mL of aqueous 5 mM acetic acid, 3.8 g APTMS and 1.7 g DMDMS were added with mixing. Sodium chloride amounts used ranged in concentration in the mixture: 50, 100, 200 and 500 mM in the aqueous mixture (prior to addition of organosilanes). The resulting mixtures were allowed to stir for 30 minutes to ensure homogeneity. The vials were then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying.

In yet another sample methodology 12a-12b for xerogel preparation involving a mixture of trialkoxysilanes and dialkoxysilanes with only base catalyst: In a vial containing 225 mg Deriphat 160c and 5 g urea co-dissolved in 15 mL water, 3.8 g APTMS and 1.7 g DMDMS were added with mixing. The resulting mixture was allowed to stir for 30 minutes to ensure homogeneity. The vial was then capped and allowed to age overnight at 80° C. in an oven. The surfactant porogen was removed by repeated washing and rinsing with a gradient solvent system from 100% water, 75:25 water:methanol, 50:50 water:methanol, 25:75 water:methanol and finally 100% methanol, followed by ambient drying. The above experiment was repeated substituting 1.7 g DMDMS with 2.6 g Pr(SH)MeDMS instead.

Figure 2A:
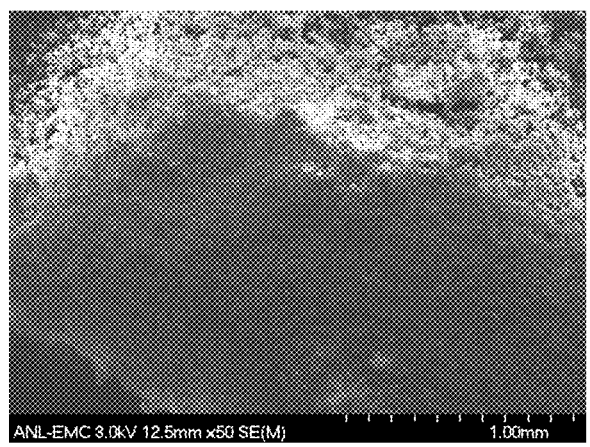
FIGS. 2A-2B show SEM images of our silica-based aerogels showing the porosity and interconnected solid network.
Figure 2B:
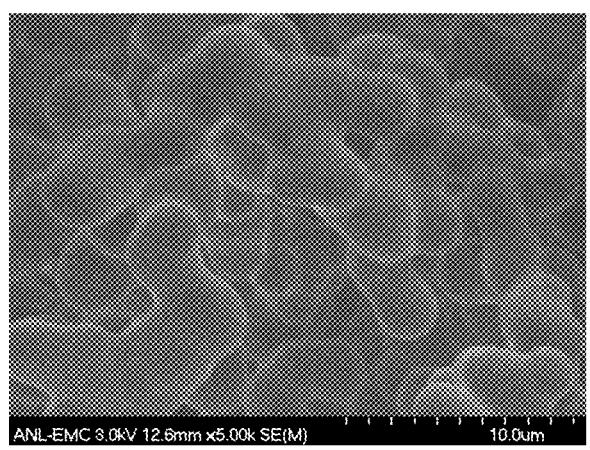

The xerogels described above may be utlized in a wide range of further processes and articles of manufacture. In one embodiment, such as illustrated in FIG. 1, the xerogel is biocompatible and includes tethering molecules, such as enzymes, while maintaining their catalytic activity, such as by the tethering the biomolecule in a manner that leaves the active site functional. The tethering molecules may be attached by known mechanisms, such as click chemistry described below or utilizing other intermediate linking molecules that are capable of binding with both the tethering molecule and the xerogel. The confinement effect within the gel pores (FIGS. 2A-2B) can also dramatically boost reaction rates between an enzyme anchored to the pore wall with a substrate or target molecule that has been adsorbed and trapped within the material.

The xerogel platform allows for the optimization of the environment of the pores, the enzyme attachment chemistries and structural features of the immobilized biocatalysts to enhance thermal stability and storage life of the materials (and longevity of components), broadening the applicability of the approach. Examples of enzymes include Agrobacterium radiobacter phosphotriesterase (arPTE) and organophosphate-hydrolyzing SsoPox derived from *Sulfolobus solfataricus*. These enzymes have been variously engineered for activity against a broad spectrum of organophosphate pesticide or warfare agents including variants that have been specifically engineered for malathion hydrolysis (malathion is an organophosphate widely used as a pesticide which, while relatively nontoxic for humans, is highly toxic to certain fish, other aquatic organisms and amphibians and is moderately toxic to birds). The recombinant enzymes show also improved bacterial expression and stability. Additionally, SsoPox is a highly stable enzyme showing activity within 10-100° C. temperature range as well as impressive resistance to the denaturing effect of urea. These enzymes are covalently immobilized onto a xerogel bearing carboxyl or azide groups. Carbodiimide EDC conjugation is employed to activate carboxyl functional groups for direct reaction with primary amines present on enzyme protein surfaces via amide bond formation.

Alternatively, enzyme tethering on azide-functionalized xerogels can also be performed utilizing copper-free click chemistry. Due to tetrahedral geometry around a Si atom (only 4 bonds per Si atom), the surface density (i.e., number of enzymes per unit area of xerogel surface) is more or less confined to 0.1-2 enzymes/nm2. However, with larger pores (i.e., at least 100 nm average diameter), one embodiment allows for a "skyscraper" approach wherein the enzymes can be bound as pendant groups off a polymer chain grown from the xerogel surface. The latter is an effective design to significantly increase the number of detoxification sites per unit surface area of the xerogel.

Figure 3A:
FIGS. 3A-3B show gels with adsorbed gold nanoparticles were immersed in an aqueous solution containing 0.1 wt % $HAuCl_4 \cdot 3H_2O$ (gold source) in 0.4 mM $NH_2OH \cdot HCl$ (reducing agent) for electroless plating (FIG. 3A) to yield gold-coated flexible gels (FIG. 3B).
Figure 3B:
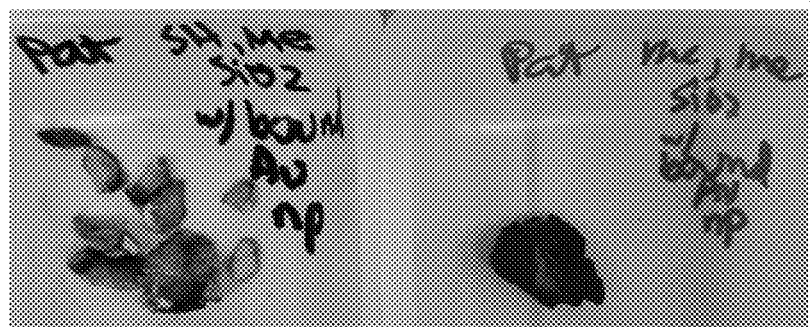

In a second embodiment, surface chemistries and properties of the gels are modified post-synthesis, such as through reaction with the reactive groups present on the surface. For example, thiol- and amine-terminated precursors lend moieties that can ligate metal atoms in solution to create metal-coated gels via electroless plating (FIGS. 3A-3B). Such adsorbents can lend specificity to targeting recovery of high-value bioproducts such as carboxylic acids (e.g., muconic and adipic acids). For example, Au-coated xerogels are readily modified with a well-known carboxylic acid scavenger, TOPO via Au-phosphine metal-ligand bond (metal complex formation). Alternatively, hydrophobic gels (e.g., made from OTMS, MTMS, etc.) also bind TOPO strongly but in noncovalent manner (Van der Waals' forces). Chemical scavengers that bind classes of compounds with near molecular recognition are widely known and cover classes that contain a wide range of element types, functional groups, and reactivities.

In a third embodiment, the gel material is used for the removal of inhibitors from feedstock and fermentation streams (e.g., such as in bioconversion processes where aldehydes and other materials inhibit the lignocellulosic conversion processes). For example, the gel material may be functionalized to bind with inhibitors, thus removing them from the feedstock as it passes through the gel. As a further example, the high affinity adsorbent gel material with near molecular recognition can be integrated into a bioreactor for static or dynamic inhibitor removal. Specifically, amine-functionalized xerogels can readily bind and remove inhibitors such as aldehydes from the bioreactor. Due to the monolithic macrostructure of the xerogel, a large piece of suitable size can simply be immersed or installed within a reactor and periodically removed once the xerogel maximum binding capacity is reached.

In one example, MTMS-DMDMS xerogel was formed and utilized in the immobilization of chemical scavengers. A CTAB-templated xerogel formed from MTMS and DMDMS was surface-coated with a phosphine oxide scavenger by a simple incipient wetness impregnation (IWI) from a hexane solution. SEM characterization of the materials suggest that this process was successful in uniformly coating all pore surfaces (even within the xerogel interior) with at least a monolayer coverage of TOPO. A series of experiments to optimize TOPO-loading was performed to determine maximum amounts of TOPO incorporated into adsorbent scaffold while maintaining advantageous xerogel properties such as flexibility and porosity. Gravimetric analyses indicates an optimal loading of 0.5 g TOPO per 1 g of xerogel.

The resulting TOPO-modified xerogel looks most promising for selective adsorption of bioproducts muconic acid and butyric acid. Muconic acid analytics were performed with a miniaturized UV/Vis spectrometer and specific absorption at 264 nm. Butyric acid analytics were performed via high-performance liquid chromatography. Rates of adsorption for the xerogel non-covalently modified with TOPO required long (at least 18 h) incubation. Adsorption capacities from a 0.5 wt % (=5 g/L) muconic acid (MW 142 g/mol) mixture indicate at least 0.13 g muconic acid per 1 g of xerogel with a 0.5 g TOPO loading.

Experimental details: 5 g/L muconic acid (MA) solution prepared by dissolving 0.5 g MA in 100 mL of 2:3 water: DMSO solvent mixture. Masses of various adsorbents were recorded, and various adsorbents were added to measured aliquots of the MA solution in separate vials. After at least 18 h, a 0.1 mL aliquot from each vial was diluted 50× into 5 mL water. Absorbances were recorded at 264 nm (Xmax, calculated average ε=27,639.42 L/mol-cm) (Reference: Beltran, F. J.; Rodriguez, E. M.; Romero, M. T. "Kinetics of the ozonation of muconic acid in water" J. Hazard. Mater. 2006, B138, 534-538.) using a blank of 0.1 mL 2:3 water: DMSO in 5 mL water.

| Adsorbent | Mass adsorbent, g | Volume of MA mixture, mL | Δ Concentration, mM | mmol MA adsorbed/g adsorbent | mg MA adsorbed/g adsorbent |
|---|---|---|---|---|---|
| MTMS Gel | 0.2169 | 20 | 4.5 | 0.42 | 59 |
| Amine Gel | 0.1635 | 15 | 2.2 | 0.20 | 29 |
| 0.5 g TOPO/g MTMS Gel* | 0.32 | 20 | 1.7 | 0.11 | 15 |
| 1 g TOPO/g MTMS Gel* | 0.37 | 20 | 2.6 | 0.14 | 20 |

Summary of adsorption results for muconic acid.

5 g/L butyric acid (BA) solution was prepared by dissolving 0.8 g BA in 150 mL of water. Masses of various adsorbents were recorded, and various adsorbents were added to measured aliquots of the BA solution in separate vials. After at least 18 h, a 0.1 mL aliquot from each vial was diluted 50× into 5 mL water. Concentrations were measured via HPLC with a VWD detector and using a calibration curve from standard solutions of 0.05-5 mM concentration (retention time=4.5 min).

MTMS xerogels with 0.5 g TOPO/g gel indicate the best capabilities for butyric acid adsorption (all other samples had negligible decrease in butyric acid concentration from bioreactor mixture):

| Adsorbent | Mass adsorbent, g | Volume of BA mixture, mL | Δ Concentration, mM | mmol BA adsorbed/g adsorbent | mg BA adsorbed/g adsorbent |
|---|---|---|---|---|---|
| 0.5 g TOPO/g MTMS Gel* | 0.6536 | 20 | 9.9 | 0.30 | 27 |

Figure 4A:
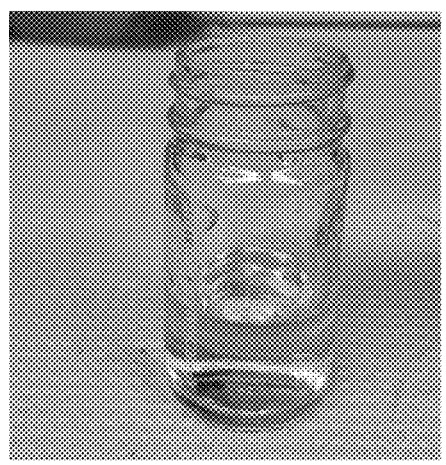
FIG. 4A shows an oil-water mixture (oil is dyed red for ease of visibility) separated into aqueous (FIG. 4B) and organic (FIG. 4C) components by squeezing out the oils adsorbed by the gel.
Figure 4B:
Figure 4C:
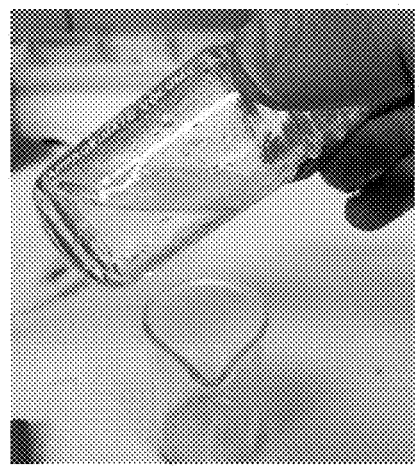
Figure 5A:
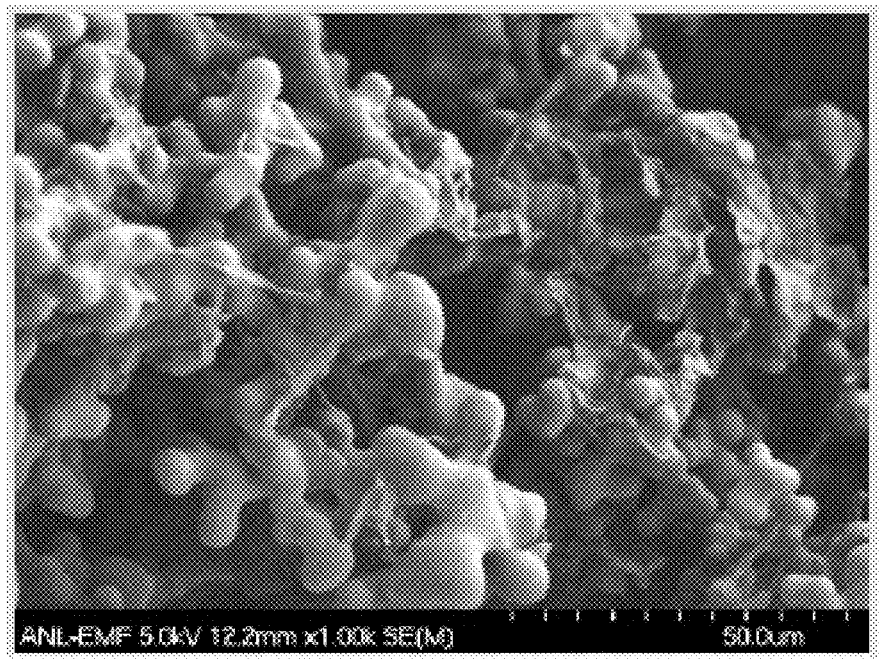
FIG. 5A is an SEM image of an interior cross-section of a hydrophobic gel whose surfaces were further modified via noncovalent tethering of a scavenger moiety such as trioctylphosphine oxide (TOPO) for binding organic acids and metal ions and metal nanoparticles; TOPO was incorporated onto the gel surfaces via incipient wetness impregnation (IWI) from a solution of TOPO in a volatile solvent such as n-hexane.
Figure 5B:
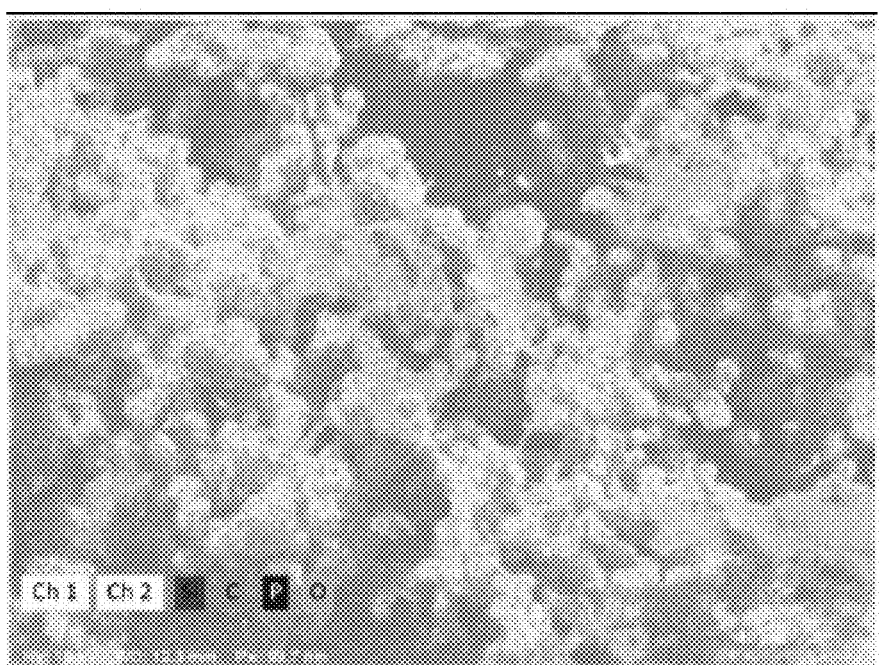
FIG. 5B is an elemental mapping via energy-dispersive x-ray photoelectron spectroscopy (SEM/EDS) of the same sample area shown in FIG. 5A, where the composition and elemental distribution of the sample is represented by different colors corresponding to specific elements FIG. 5B.
Figure 6A:
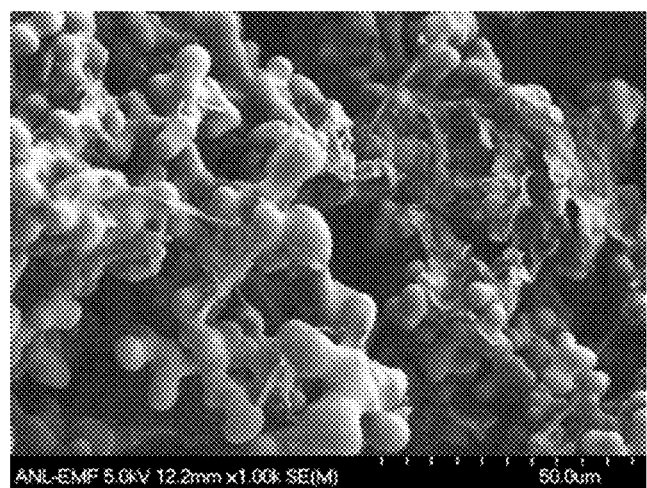
FIGS. 6A-6C show images of a TOPO-modified xerogel.
Figure 6B:
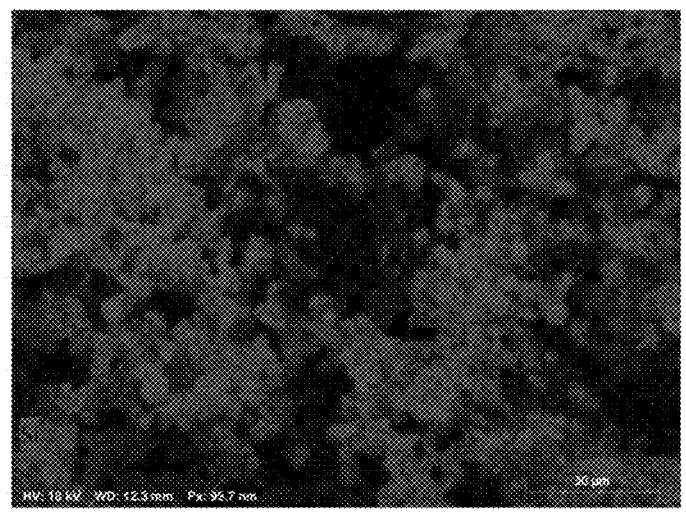
Figure 6C:

In a fourth embodiment, we have demonstrated the ability of a set of hydrophobic gels to selectively adsorb hydrocarbons for efficient oil-water separations (FIGS. 4A-4C). Hydrophobic xerogels are made with combinations of alkyl and aromatic organosilanes, more hydrophilic xerogels are achieved with amine and combinations thereof with thiol organosilane precursors.

In one example, 0.36 g of MTMS-DMDMS xerogel adsorbant (NA) is used as adsorbent to remove a hydrocarbon from an oily-water mixture with 3.2 mL of farnesol (C15 alcohol; sometimes dyed for illustrative purposes) in 10 mL of water. The dyed hydrocarbon is observed to determine the performance of the xerogel as a separator. All farnesol was observed to be removed from the water. Nearly 100% of the farnesol was then removed and recovered from the gel by a manual squeezing. The gel was observed to have minimal adsorption of water along with the farnesol. The observed capacity for farnesol adsorption was at least 8× mass of the gel. Other hydrocarbons demonstrated to be captured from oily-water mixtures using a MTMS-DMDMS xerogel include farnesene and bisabolene.

Figure 7:
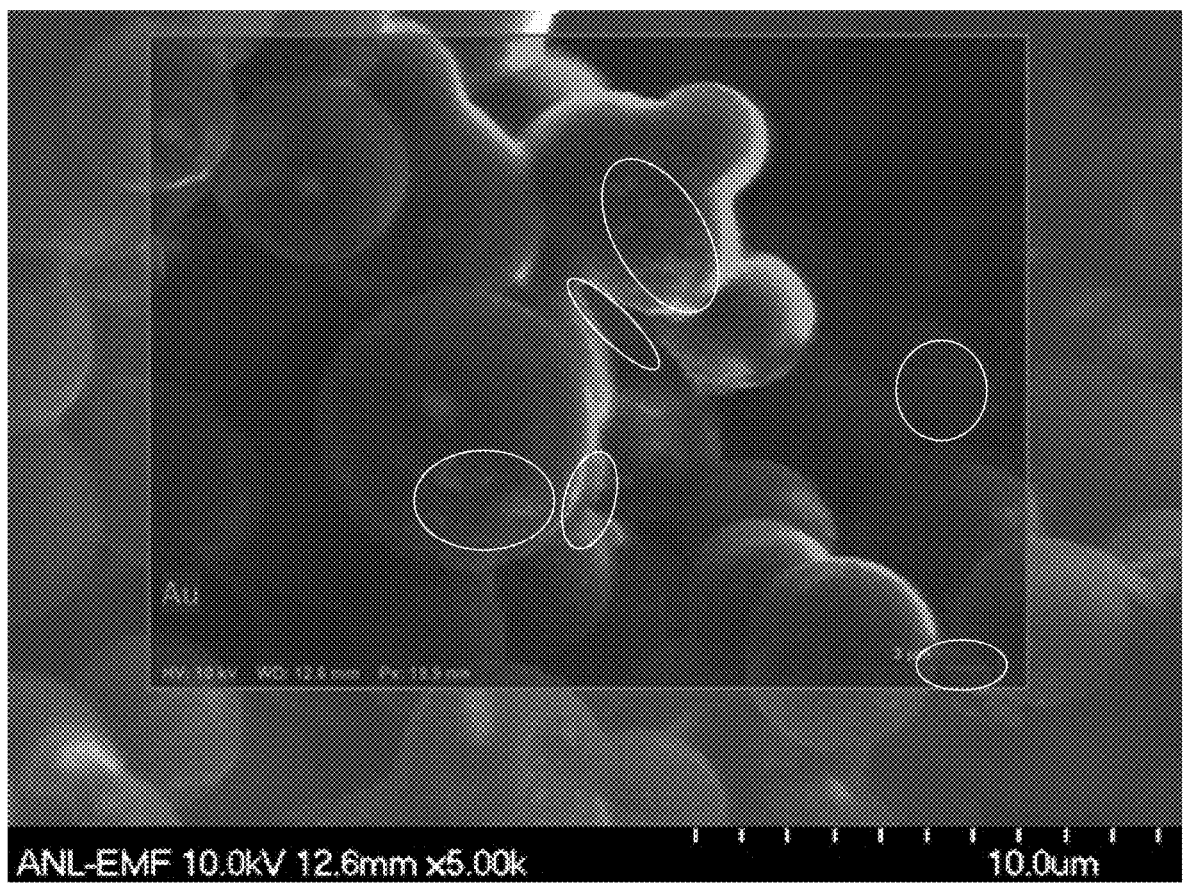
FIG. 7 shows an SEM image of a thiol-based xerogel, with an overlaid elemental mapping via EDS to visualize successful tethering of Au (mapped in lighter tones indicated by white indicators) nanoparticles.
Figure 8:
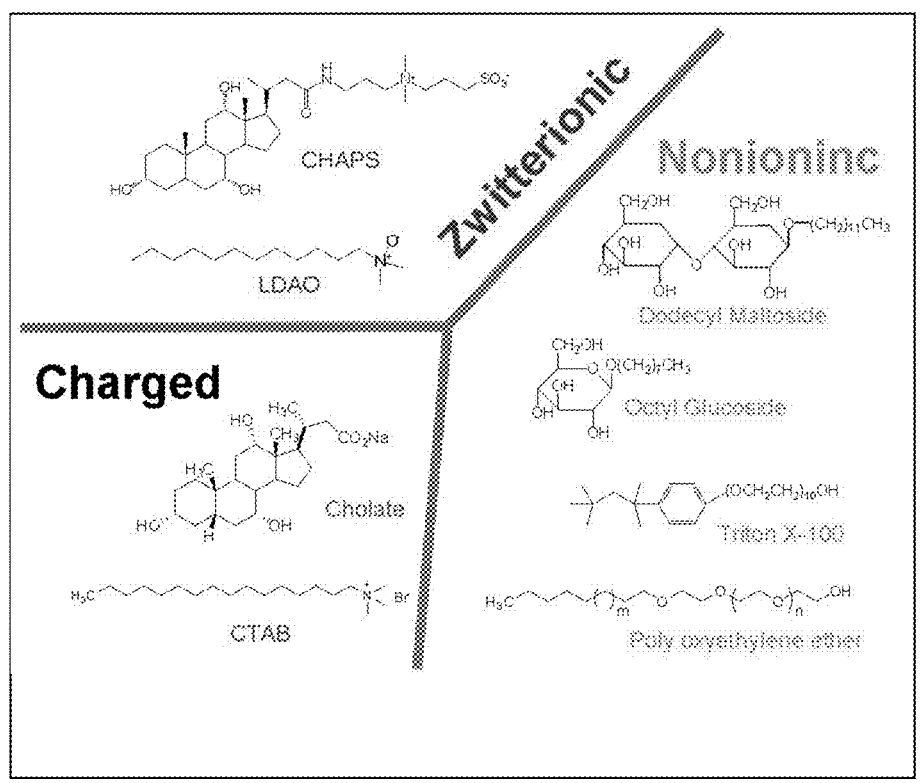
FIG. 8 is a graphic depicting common detergent classes used presently in biological research that have potential application in xerogel synthesis.

In a fifth embodiment, xerogels born from organosilane precursors APTMS and/or Pr(SH)TMS and Pr(SH)MeDMS were immersed in a colloidal suspension of 3 nm gold nanoparticles in water. Thiol and amine terminal groups function to anchor Au nanoparticles onto the surface, which then act as nucleation sites for uniform coverage of thin Au shell in an electroless plating solution (see below. SEM characterization of the materials (FIG. 7) suggest that this process was successful.

The gold adsorbed to amine- and thiol-functionalized xerogels made from precursors APTMS, Pr(SH)TMS and Pr(SH)MeDMS can be extracted by electroless plating using an aqueous solution of 0.1 wt % $HAuCl_4 \cdot 3H_2O$ in 0.4 mM of $NH_2OH \cdot HCl$ as the reducing agent.

Similarly, a xerogel can be used to separate and capture radioactive metals, such as through the use of TOPO modified xerogels.

In a sixth embodiment, the xerogel can be used to capture and remediate target materials such as biochemical warfare agents, contaminants, or other undesirable materials.

Liquid adsorbates (e.g., oils) captured by xerogels can be recovered by a simple and relatively low-cost squeezing mechanism, such as by passing through rollers or with a squeegee. On the other hand, adsorbed molecules from mixture that are solids at ambient temperature and pressure may not be recovered in a similar manner. These adsorbed molecules can be recovered from the xerogel by immersing the scaffold in a minimum amount of solvent where the adsorbed species is soluble in. As for gaseous species captured by xerogels, these molecules can be recovered (depending on the nature of binding with the xerogel—must be noncovalent) by a simple heating mechanism or immersion in minimum amounts of a suitable solvent.

Further, the xerogel materials described herein are, in certain embodiments, re-usable. That is, for example, in bioreactor or desorption applications, the xerogel material can be re-used for multiple adsorption/desorption cycles, such up to 100 such cycles. This reduces the costs of synthesis by comparision and the cost of their use is only that energy needed to add them to and remove them from the bioreactor and the desorption process itself.

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

We claim:

1. A method of making an xerogel material comprising:
   mixing organosilane precursors, a catalyst, and a zwitterionic porogen to form a reaction mixture in a solvent;
   reacting the organosilane precursors forming a silica-based material patterned on the zwitterionic porogen;
   removing the zwitterionic porogen.

2. The method of claim 1 wherein the organosilane precursor has the formula:
   $R_y$—Si—$(OR)_x$, where R is an alkyl and where x=1–3 and y+x=4.

3. The method of claim 1, wherein the organosilane precursors comprise a trialkoxysilane.

4. The method of claim 1, wherein the trialkoxysilane is selected from the group consisting of methyltrimethoxysilane (MTMS), octyltrimethoxysilane (OTMS) and phenyltrimethoxysilane (PTMS).

5. The method of claim 1, wherein the catalyst is acidic.

6. The method of claim 1, wherein the catalyst is basic.

7. The method of claim 1, wherein reacting the organosilane precursors is carried out over a period of time between 15 minutes and 7 days at a temperature up to the boiling point of the sovent.

8. The method of claim 7, wherein the temperature is at least 80° C.

9. The method of claim 1, further comprising modifying the xerogel with a tethering molecule.

10. The method of claim 9, wherein a chemical scavenger is tethered to the xerogel.

11. The method of claim 1, further comprising removing the zwitterionic porogen by rinsing with a gradient solvent system.

12. The method of claim 1, further comprising a second zwitterionic porogen mixed to form the reaction mixture in the solvent.

13. The method of claim 1, further comprising mixing a second organosilane precursor with the organosilane precursor, catalyst, and the zwitterionic porogen.

14. The method of claim 12, wherein the first organosilane precursor is a trialkoxysilane and the second organosilane precursor is a dialkoxysilane.

* * * * *